July 10, 1923.  
W. W. HILEMAN  
TIRE TOOL  
Filed Feb. 20, 1922
1,461,616
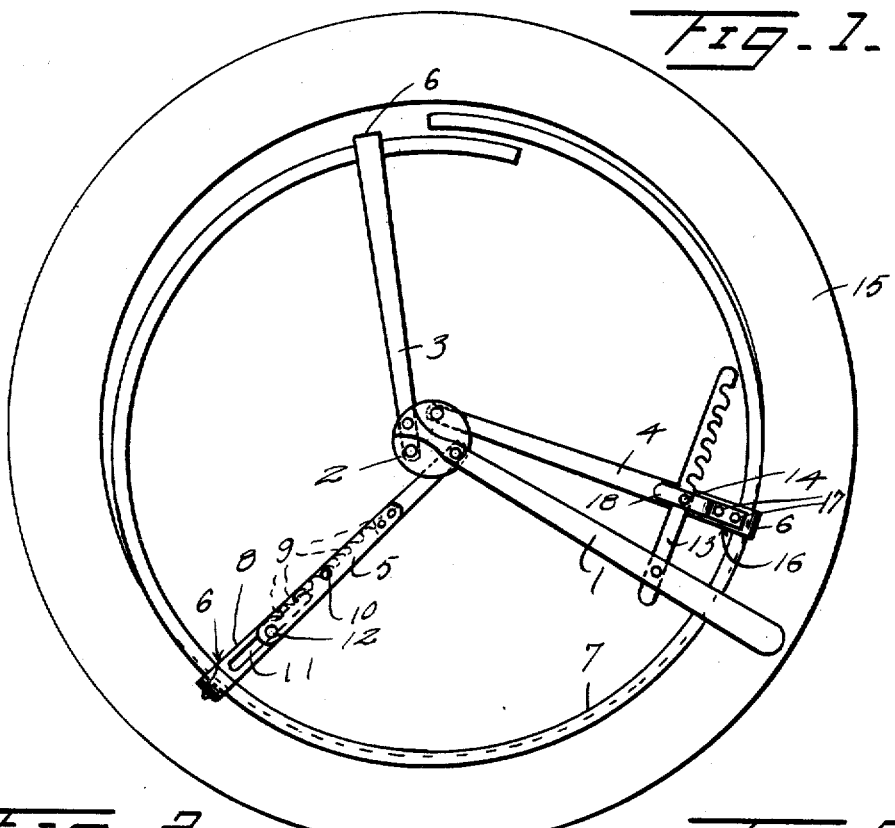
Fig. 1.
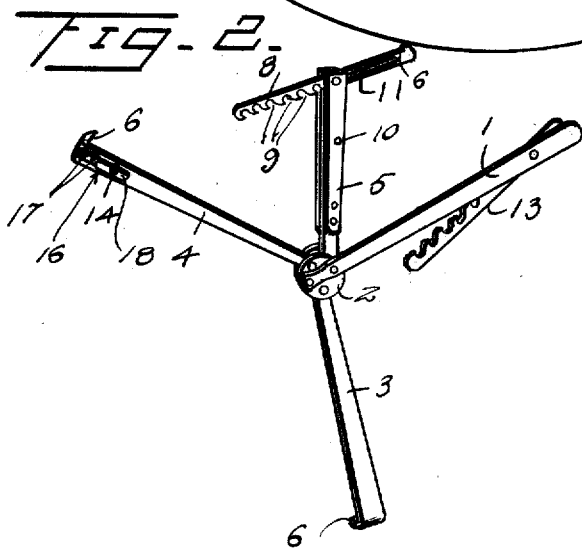
Fig. 2.
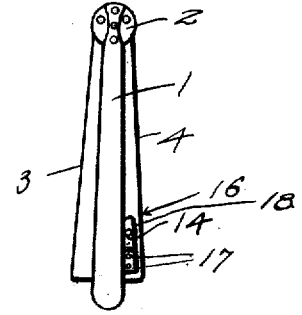
Fig. 3.
Inventor  
W. W. Hileman
By  
Attorney Patented July 10, 1923.

1,461,616

UNITED STATES PATENT OFFICE.

WILLIS W. HILEMAN, OF JONESBORO, ILLINOIS, ASSIGNOR OF ONE-HALF TO CHARLES H. BRUCHHAUSER, OF ANNA, ILLINOIS.

TIRE TOOL.

Application filed February 20, 1922. Serial No. 537,900.

*To all whom it may concern:*

Be it known that I, WILLIS W. HILEMAN, a citizen of the United States, residing at Jonesboro, in the county of Union and State of Illinois, have invented certain new and useful Improvements in Tire Tools; and I do hereby declare the following to be a full, clear, and exact description of the invention, such as will enable others skilled in the art to which it appertains to make and use the same.

This invention has for its object the provision of means whereby to facilitate the dismounting of pneumatic tires from split rims which are contracted to admit of the easy removal of the tire therefrom for any required purpose.

The invention aims to provide a tool of the character aforesaid which is efficient in service, adapted to be readily manipulated, adjustable within certain limits to different sized rims and capable of being folded into compact form so as to be readily carried as an adjunct to a kit of tools for automobiles and motor vehicles generally.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is an elevation showing the application of the tool,

Figure 2 is a detail view in perspective of the tool, and

Figure 3 is a view showing the tool folded for convenience of handling and storing so as to be conveniently carried as an accessory to a tool kit.

Corresponding and like parts are referred to in the following description and designated in the several views of the drawings by like reference characters.

The tool comprises an operating lever 1 which is provided at one end with a head 2. Arms 3, 4 and 5 are pivoted at their inner ends to the head 2, one of the arms, as 5, being adjustable as to length to admit of adjusting the tool to different sized rims within certain limits. Each of the arms is provided at its outer end with a hook 6 to positively engage the rim 7. The arm 5 has an adjustable section 8 which is formed along an edge with a plurality of teeth 9 which are adapted to cooperate with a pin 10 or like part to hold the section 8 in the required adjusted position. A longitudinal slot 11, formed in the section 8, receives a pin 12 of the arm 5, whereby to retain the section in position and prevent displacement thereof. A toothed bar 13 is pivoted at one end to the lever 1 and is adapted to cooperate with a pin 14 or like part carried by the arm 4, whereby to hold the part in the required adjusted position as indicated most clearly in Figure 1. When the tool is not required for immediate service, it may be folded into compact form, as illustrated in Figure 3, whereby it may be conveniently carried as an accessory of a tool kit.

In operation, the arms of the tool are extended and the hooks 6 thereof engage over the outer side of the rim 7 to be contracted, the arms when extended being approximately equidistant. After the tool has been adjusted to the rim 7, the lever 1 is rotated in the plane of the rim thereby drawing the arms inward and contracting the rim, as illustrated in Figure 1, whereby the tire 15 may be readily removed therefrom or placed in position thereon. The rim is held contracted by engaging the toothed bar 13 with the pin or stop 14.

In order to prevent the tooth bar 13 from moving laterally off of the pin or stop 14, a guard 16 is employed. This guard is secured as at 17 to the arm 4 and it is provided with an off set portion 18 through which the pin or stop 14 passes and which engages the outer side of the toothed bar 13 when the latter is in engagement with the pin or stop 14.

What is claimed is:

1. A tire tool of the character specified comprising an operating lever, arms pivoted at their inner ends to an end portion of the operating lever at different points and having rim engaging elements at their outer ends, one of said arms being of sectional formation, the outer section having a longitudinal slot and a plurality of teeth along an edge, a pin carried by the inner section and passing through said slot and pivoting the outer section to the inner section, a stop on the inner section to coact with the teeth of the outer section to hold the latter in the required adjusted position, and cooperating means between the operating lever and one of the arms to hold the parts in adjusted position when the tool is in active service.

2. A tire tool comprising an operating lever having a head rigidly secured to its inner end and lying parallel therewith, arms pivoted at their inner end to said head at different points adjacent the edge of the head, a pair of said arms having rim engaging elements at their free ends, the other of said arms being sectional, the inner section of said arm comprising a pair of spaced bars one of which is secured to each side of the member which is secured to the head, the outer section of said arm positioned between the bars mentioned and having a longitudinal slot through which a pin carried by said bars passes, said outer section having a series of teeth along one edge, said teeth adapted to be selectively engaged with a second pin carried by said bars and which is spaced from the ends thereof, the outer end of said outer section being provided with a rim engaging element, a bar pivoted to the operating lever and having a series of teeth along one edge adapted to engage a pin carried by an adjacent arm to hold the parts in active position, and a guard means associated with said pin to prevent said bar moving laterally of the pin.

In testimony whereof I affix my signature in presence of two witnesses.

WILLIS W. HILEMAN.

Witnesses:
C. H. BRUCHHAUSER,
WILLIAM BENSON.